US011003324B1

(12) United States Patent
Abrego et al.

(10) Patent No.: US 11,003,324 B1
(45) Date of Patent: May 11, 2021

(54) METHOD AND SYSTEM FOR LINKING SOURCE EVIDENCE TO VALUATION INFORMATION

(71) Applicant: JPMorgan Chase Bank, N.A., New York, NY (US)

(72) Inventors: Kevin Abrego, Houston, TX (US); Bendangrenla Aier, London (GB); Harshavardhan Reddy Mukkera, Sugar Land, TX (US); Mahendrapratap Singh, Houston, TX (US); Colin McKinney, Bishopton (GB); Eric Ngo Nguyen, Houston, TX (US); Ricky P. Chandnani, Dover, NJ (US); Ked Fisseha, New York, NY (US); Bret Goldsmith, Sugarland, TX (US)

(73) Assignee: JPMORGAN CHASE BANK, N.A., New York, NY (US)

( * ) Notice: Subject to any disclaimer, the term of this patent is extended or adjusted under 35 U.S.C. 154(b) by 0 days.

(21) Appl. No.: 16/851,628

(22) Filed: Apr. 17, 2020

(51) Int. Cl.
*G06F 3/0482* (2013.01)
*G06F 16/93* (2019.01)
(Continued)

(52) U.S. Cl.
CPC .......... *G06F 3/0482* (2013.01); *G06F 3/1454* (2013.01); *G06F 16/93* (2019.01);
(Continued)

(58) Field of Classification Search
CPC ...... G06F 3/0482; G06F 16/93; G06F 3/1454; G06Q 10/10; G06Q 50/18; H04L 67/02
See application file for complete search history.

(56) References Cited

U.S. PATENT DOCUMENTS

2008/0270425 A1* 10/2008 Cotgreave ............. G06F 16/583
2013/0151989 A1*  6/2013 Dent ....................... G06F 16/20
                                                    715/753
(Continued)

OTHER PUBLICATIONS

Pir Abdul Rasool Qureshi et al., Detecting Terrorism Evidence in Text Documents, Aug. 1, 2010, IEEE Computer Society, pp. 521-527 (Year: 2010).*

(Continued)

*Primary Examiner* — Tam T Tran
(74) *Attorney, Agent, or Firm* — Greenblum & Bernstein, P.L.C.

(57) ABSTRACT

A method and a system for providing source evidence in support of information to be used for conducting a transaction, such as a fairness opinion to be used for a mergers and acquisitions (M&A) transaction, is provided. The method includes displaying, on a screen, a plurality of fields that relate to the transaction; receiving first user inputs that correspond to some of the fields; prompting the user to provide source evidence that relates to the received first user inputs; receiving a second user input that activates a button for accessing a document library; displaying a list of documents included in the document library; receiving third user inputs that correspond to respective documents selected by the user; displaying a content of each selected document; receiving fourth user inputs that correspond to screenshots of respective portions of the displayed content; and automatically linking the screenshots to the corresponding fields.

20 Claims, 8 Drawing Sheets

(51) Int. Cl.
*H04L 29/08* (2006.01)
*G06Q 50/18* (2012.01)
*G06F 3/14* (2006.01)
*G06Q 10/10* (2012.01)

(52) U.S. Cl.
CPC ............ *G06Q 10/10* (2013.01); *G06Q 50/18* (2013.01); *H04L 67/02* (2013.01)

(56) References Cited

U.S. PATENT DOCUMENTS

| | | | |
|---|---|---|---|
| 2014/0122368 A1* | 5/2014 | Gittleman | G06Q 10/0832 705/332 |
| 2015/0242930 A1* | 8/2015 | Greystoke | G06Q 30/0619 705/26.7 |
| 2017/0236196 A1* | 8/2017 | Isaacson | G06Q 30/0641 705/14.51 |

OTHER PUBLICATIONS

Chokdee Liophanich et al., Automatic E-Evidence Generation System and Duplicate Reduction, Jan. 1, 2005, IEEE Computer Society, pp. 1-8 (Year: 2005).*

* cited by examiner

510

520

METHOD AND SYSTEM FOR LINKING SOURCE EVIDENCE TO VALUATION INFORMATION

BACKGROUND

1. Technical Field

The present disclosure relates to the field of providing evidence that relates to a source of information. More particularly, the present disclosure relates to a method and system for providing source evidence with respect to information that is usable for supporting values and valuations provided in connection with a fairness opinion generated in preparation for a mergers and acquisitions (M&A)-type transaction.

2. Background

In preparation for a mergers and acquisitions (M&A)-type transaction, M&A professional personnel are required to produce a transaction comparables analysis (also referred to herein as a "transaction comps"), which is crucial in the valuation process. The transaction comps must be backed up by source evidence, such as screen shots, text comments, and/or spreadsheet data, that supports the values provided while spreading comparables. This is especially mandatory for a fairness opinion. Conventionally, commercial spreadsheet software has often been used to spread comparables, and then HTML, links have been copied or pasted as source evidence.

Occasionally, such HTML links expire, or a link may be updated to include a different version of the underlying source document. In these cases, new sources may be required to be added; and in some situations, the proposed M&A transaction may need to be reevaluated. A single M&A transaction may involve dozens of values that need source evidence, and as a result, there may be a significant delay. Further, incorrect data may lead to regulatory fines and/or reputational damage.

In this aspect, the present inventors have recognized that there is a need for an efficient and reliable way to provide source evidence with respect to information that is usable for supporting values and valuations provided in connection with a fairness opinion generated in preparation for a mergers and acquisitions (M&A)-type transaction.

SUMMARY

The present disclosure, through one or more of its various aspects, embodiments, and/or specific features or sub-components, provides, inter alia, various systems, servers, devices, methods, media, programs; and platforms for providing source evidence with respect to information that is usable for supporting values and valuations provided in connection with a fairness opinion generated in preparation for a mergers and acquisitions (M&A)-type transaction.

According to an aspect of the present disclosure, a method for providing source evidence in support of information to be used for conducting a transaction is provided. The method is implemented by at least one processor. The method includes: displaying, on a screen, a plurality of fields that relate to the transaction; receiving, from a user, a first user input that corresponds to a first field from among the plurality of fields; prompting the user to provide source evidence that relates to the received first user input; displaying; on the screen, a button that enables the user to access a document library database; receiving a second user input that activates the displayed button; displaying a list of documents included in the document library database; receiving a third user input that corresponds to a first document selected by the user; displaying a content of the first document; receiving a fourth user input that corresponds to a screenshot of a portion of the displayed content of the first document; and automatically linking the screenshot to the first field.

The method may further include detecting that a cursor is hovering over the first field; and displaying the screenshot and a button that enables the user to access the first document in response to the detecting.

The method may further include: receiving, from the user, at least a first additional user input that corresponds to at least a second field from among the plurality of fields; prompting the user to provide source evidence that relates to the received at least first one additional user input; displaying, on the screen, the button that enables the user to access the document library database; receiving at least a second additional user input that activates the displayed button; displaying the list of documents included in the document library database; receiving at least a third additional user input that corresponds to at least a second document selected by the user; displaying a content of the at least second document; receiving at least a fourth additional user input that corresponds to at least one additional screenshot of a portion of the displayed content of the at least second document; and automatically linking the at least one additional screenshot to the at least second field.

The transaction may be a mergers and acquisitions (M&A)-type transaction.

The method may further include generating a fairness opinion report based on the received user inputs and the linked screenshots.

The method may further include determining, prior to the generating of the fairness opinion report, whether there is at least one field for which no source evidence has been provided; and when a determination is made that source evidence has been provided for all fields included in the plurality of fields, validating the information included in the received user inputs.

The method may further include: when a determination is made that there is at least one field for which no source evidence is provided, displaying a warning icon that pro the user to provide source evidence with respect to the at least one field prior to the generating of the fairness opinion report.

The method may further include receiving, for a third field from among the plurality of fields and in response to the prompting, at least a sixth additional user input that includes a formula that corresponds to a value included in the third field.

The method may further include displaying a button that enables the user to submit a request for uploading a user-identified document; and in response to receiving the request, uploading the user-identified document and storing the user-identified document in the document library database.

The method may further include displaying a comment field that enables the user to enter a textual comment.

According to another aspect of the present disclosure, a computing apparatus for facilitating a provision of source evidence in support of information to be used for conducting a transaction is provided. The computing apparatus includes a processor, a memory, a display screen, and a communication interface coupled to each of the processor, the memory, and the display screen. The processor is configured to: display, on the display a screen, a plurality of fields that relate to the transaction; receive, from a user via the communication interface, a first user input that corresponds to a first field from among the plurality of fields; prompt the user to provide source evidence that relates to the received first user input; display, on the display screen, a button that enables the user to access a document library database; receive a second user input that activates the displayed button; display a list of documents included in the document library database; receive a third user input that corresponds to a first document selected by the user; display a content of the first document, receive a fourth user input that corresponds to a screenshot of a portion of the displayed content of the first document; and automatically link the screenshot to the first field.

The processor may be further configured to detect that a cursor is hovering over the first field; and to display the screenshot and a button that enables the user to access the first document in response to the detection.

The processor may be further configured to: receive, from the user via the communication interface, at least a first additional user input that corresponds to at least a second field from among the plurality of fields; prompt the user to provide source evidence that relates to the received at least first one additional user input; display, on the display screen, the button that enables the user to access the document library database; receive at least a second additional user input that activates the displayed button; display the list of documents included in the document library database; receive at least a third additional user input that corresponds to at least a second document selected by the user; display a content of the at least second document; receive at least a fourth additional user input that corresponds to at least one additional screenshot of a portion of the displayed content of the at least second document; and automatically link the at least one additional screenshot to the at least second field.

The transaction may be a mergers and acquisitions (M&A)-type transaction.

The processor may be further configured to generate a fairness opinion report based on the received user inputs and the linked screenshots.

The processor may be further configured to determine, prior to the generation of the fairness opinion report, whether there is at least one field for which no source evidence has been provided; and when a determination is made that source evidence has been provided for all fields included in the plurality of fields, validate the information included in the received user inputs.

The processor may be further configured to: when a determination is made that there is at least one field for which no source evidence is provided, display a warning icon that prompts the user to provide source evidence with respect to the at least one field prior to the generation of the fairness opinion report.

The processor may be further configured to receive, for a third field from among the plurality of fields and in response to the prompting, at east a sixth additional user input that includes a formula that corresponds to a value included in the third field.

The processor may be further configured to display a button that enables the user to submit a request for uploading a user-identified document; and in response to receiving the request, upload the user-identified document and store the user-identified document in the document library database.

The processor may be further configured to display a comment field that enables the user to enter a textual comment.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIGS. SA, 5B, SC, 5D, and SE are screenshots that illustrate respective steps of an exemplary process for providing source evidence with respect to information that is usable for supporting values and valuations provided in connection with a fairness opinion generated in preparation for an M&A-type transaction.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
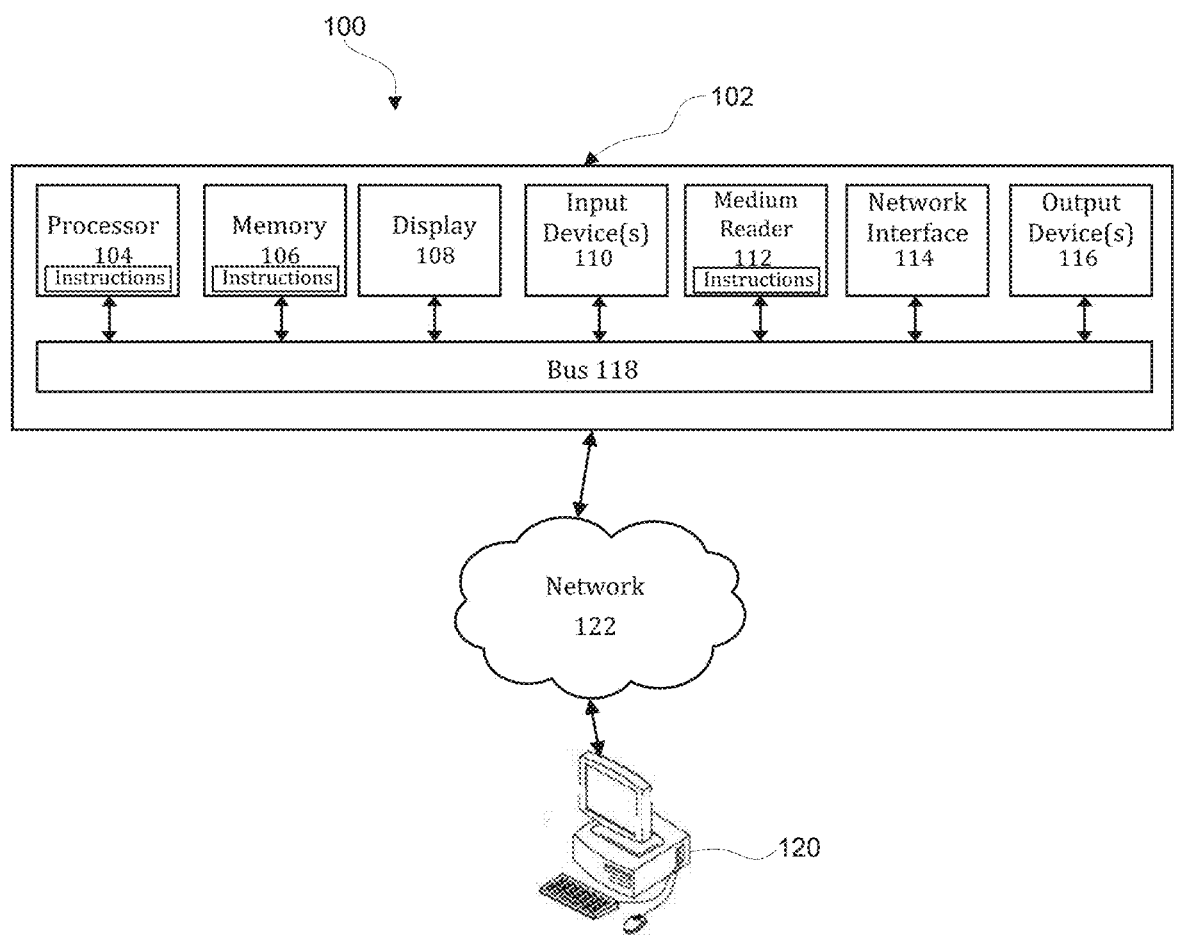
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any, time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (MID), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a video display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

Figure 2:
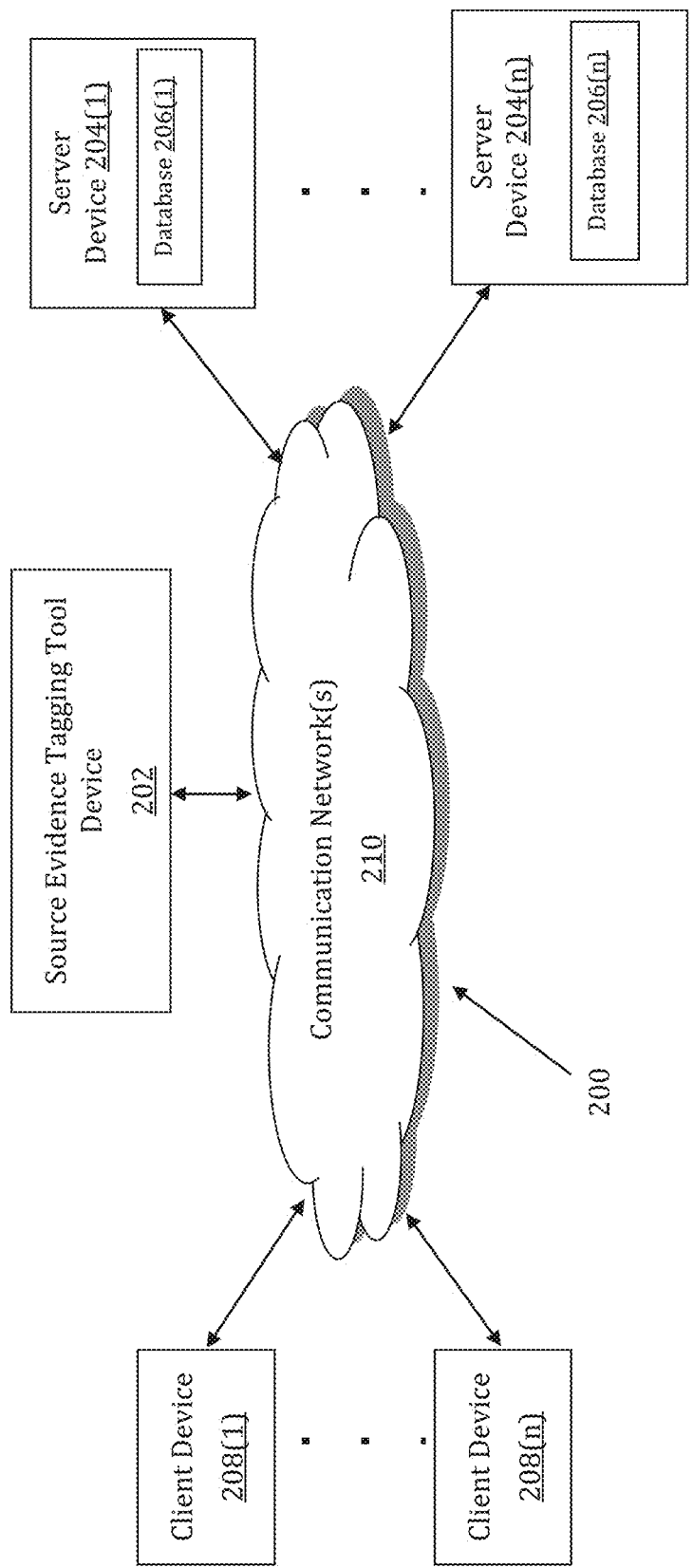
FIG. 2 illustrates an exemplary diagram of a network environment.

Referring to FIG. 2, a schematic of an exemplary network environment 200 for implementing a method for providing source evidence with respect to information that is usable for supporting values and valuations provided in connection with a fairness opinion generated in preparation for an M&A-type transaction is illustrated. In an exemplary embodiment, the method is executable on any networked computer platform, such as, for example, a personal computer (PC).

The method for providing source evidence with respect to information that is usable for supporting values and valuations provided in connection with a fairness opinion generated in preparation for an M&A-type transaction may be implemented by a Source Evidence Tagging Tool (SETT) device 202. The SETT device 202 may be the same or similar to the computer system 102 as described with respect to FIG. 1. The SETT device 202 may store one or more applications that can include executable instructions that, when executed by the SETT device 202, cause the SETT device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the SETT device 202 itself, may be located in virtual server(s) running in a cloud-based computing environment rather than being tied to one or more specific physical network computing devices. Also, the application(s) may be running in one or more virtual machines (VMs) executing on the SETT device 202. Additionally, in one or more embodiments of this technology, virtual machine(s) running on the SETT device 202 may be managed or supervised by a hypervisor.

In the network environment 200 of FIG. 2, the SETT device 202 is coupled to a plurality of server devices 204(1)-204(n) that hosts a plurality of databases 206(1)-206(n), and also to a plurality of client devices 208(1)-208(n) via communication network(s) 210, A communication interface of the SETT device 202, such as the network interface 114 of the computer system 102 of FIG. 1, operatively couples and communicates between the SETT device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the SETT device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and SETT devices that efficiently implement methods and systems for providing source evidence with respect to information that is usable for supporting values and valuations provided in connection with a fairness opinion generated in preparation for an M&A-type transaction.

By way of example only, the communication network(s) 210 may include local area network(s) (LAN(s)) or wide area networks) (WAN(s)), and can use TCP/IP over Ethernet and industry-standard protocols, although other types and/or numbers of protocols and/or communication networks may be used. The communication network(s) 202 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The SETT device 202 may be a standalone device or integrated with one or more other devices or apparatuses, such as one or more of the server devices 204(1)-204(n), for example. In one particular example, the SETT device 202 may include or be hosted by one of the server devices 204(1)-204(n), and other arrangements are also possible. Moreover, one or more of the devices of the SETT device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the SETT device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) host the databases 206(1)-206(n) that are configured to store documents, financial data, and historical M&A data.

Although the server devices 204(1)-204(n) are illustrated as single devices, one or more actions of each of the server devices 204(1)-204(0 may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a duster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can access the SETT device. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example.

The client devices 208(1)-208(n) may run interface applications, such as standard web browsers or standalone client applications, which may provide an interface to communication with the SETT device 202 via the communication network(s) 210 in order to communicate resource usage data. The client devices 208(1)-208(n) may further include, among other features, a display device, such as a display screen or touchscreen, and/or an input device, such as a keyboard, for example.

Although the exemplary network environment 200 with the SETT device 202, t server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the SETT device 202, the server devices 204(1)-204(n), or the client devices 208(1)-208(n), for example, may be configured to operate as virtual instances on the same physical machine. In other words, one or more of the SETT device 202, the server devices 204(1)-204(n), or the client devices 208(1)-208(n) may operate on the same physical device rather than as separate devices communicating through communication network(s) 210. Additionally, there may be more or fewer SETT devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer systems) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
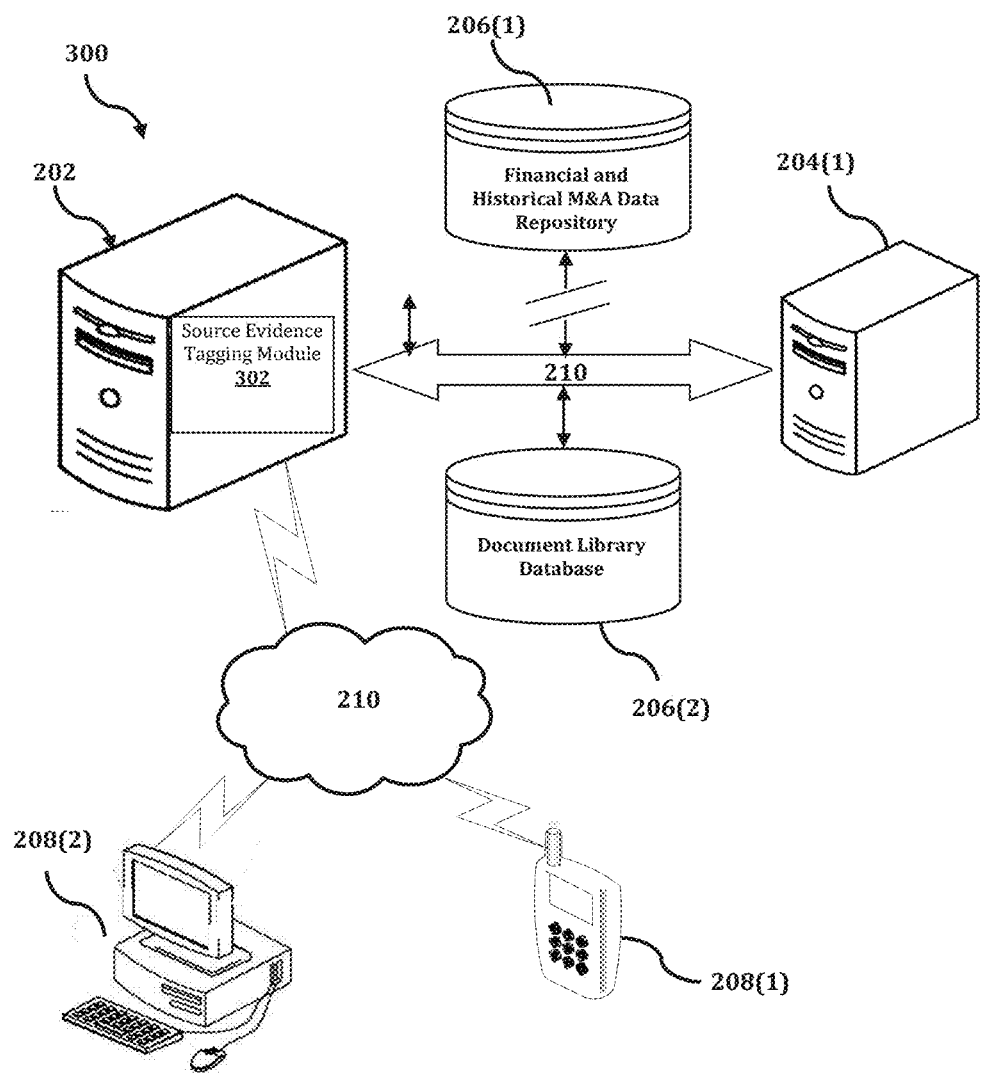
FIG. 3 shows an exemplary system for providing source evidence with respect to information that is usable for supporting values and valuations provided in connection with a fairness opinion generated in preparation for an M&A-type transaction.

The SETT device 202 is described and shown in FIG. 3 as including a source evidence tagging module 302, although it may include other modules, databases, or applications, for example. As will be described below, the source evidence tagging module 302 is configured to implement a method for providing source evidence with respect to information that is usable for supporting values and valuations provided in connection with a fairness opinion generated in preparation for an M&A-type transaction.

An exemplary process 300 for providing source evidence with respect to information that is usable for supporting values and valuations provided in connection with a fairness opinion generated in preparation for an M&A-type transaction by utilizing the network environment of FIG. 2 is shown as being conducted in FIG. 3. Specifically, a first client device 208(1) and a second client device 208(2) are illustrated as being in communication with SETT device 202. In this regard, the first client device 208(1) and the second client device 208(2) may be "clients" of the SETT device 202 and are described herein as such. Nevertheless, it is to be known and understood that the first client device 208(1) and/or the second client device 208(2) need not necessarily be "clients" of the SETT device 202, or any entity described in association therewith herein. Any additional or alternative relationship may exist between either or both of the first client device 208(1) and the second client device 208(2) and the SETT device 202, or no relationship may exist.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(20 may communicate with the SETT device 202 via broadband or cellular communication. The SETT device 202 may access a financial and historical M&A data repository 206(1) and a document library database 206(2). Of course, these embodiments are merely exemplary and are not limiting or exhaustive.

Upon being started, the source evidence tagging module 302 executes a process for providing source evidence with respect to information that is usable for supporting values and valuations provided in connection with a fairness opinion generated in preparation for an M&A-type transaction. An exemplary process for providing source evidence with respect to information that is usable for supporting values and valuations provided in connection with a fairness opinion generated in preparation for an M&A-type transaction is generally indicated at flowchart 400 in FIG. 4.

Figure 4:
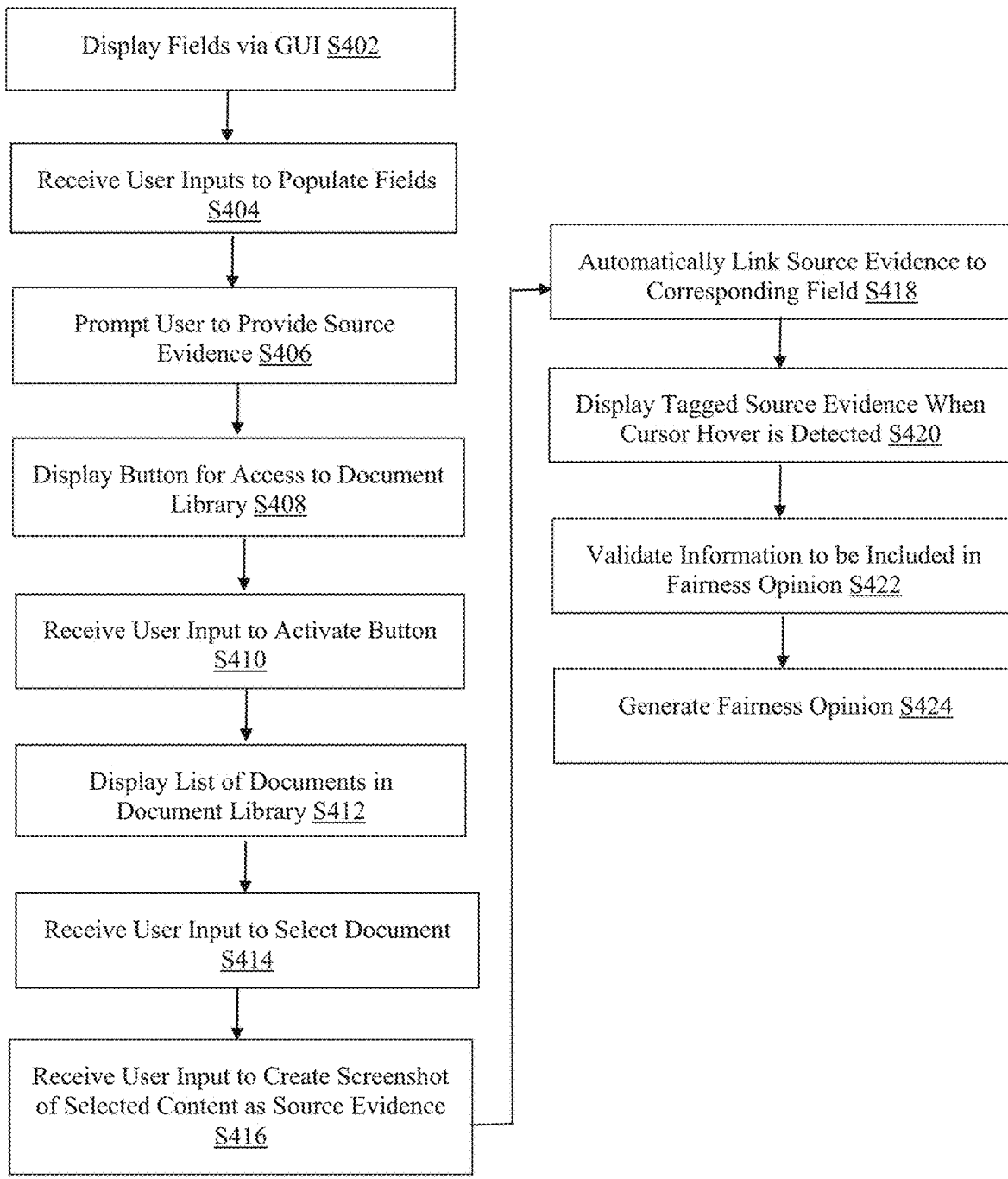
FIG. 4 is a flowchart of an exemplary process for providing source evidence with respect to information that is usable for supporting values and valuations provided in connection with a fairness opinion generated in preparation for an M&A-type transaction.

In the process 400 of FIG. 4, in step S402, a set of fields that relate to a proposed transaction are displayed via a graphical user interface (GUI) on a screen. In an exemplary embodiment, the proposed transaction is an M&A-type transaction and the fields relate to a fairness opinion that is being generated for the proposed transaction.

Figure 5A:

In step S404, a user provides inputs to the fields. In an exemplary embodiment, the inputs are numerical values that represent valuations or financial metrics. Then, in step S406, the source evidence tagging module 302 prompts the user to provide source evidence that relates to one or more of the inputted values. Referring to FIG. 5A, a first screenshot 510 of a GUI according to an exemplary embodiment illustrates two fields, respectively labeled as "Equity value" and "Firm value", and two corresponding values, i.e., 450 and 2741.38, have been inputted by a user. For the "Firm value" entry of 2741.38, the user has not yet provided source evidence in support of this value, and so the source evidence tagging module prompts the user by displaying a message as follows: "Please provide source evidence or backup calculation if available".

Figure 5B:

At step S408, the source evidence tagging module 302 displays a button that enables the user to access the document library database 206(2), in response to the request for source evidence. Referring to FIG. 5B, a second screenshot 520 of the GUI according to an exemplary embodiment illustrates a button that is labeled as follows: "GO TO DOCUMENT LIBRARY". Then, at step S410, the user activates the button e.g., by clicking on it using a cursor and a mouse, and a list of documents that is stored in the document library database 206(2) is then displayed at step S412.

Figure 5C:
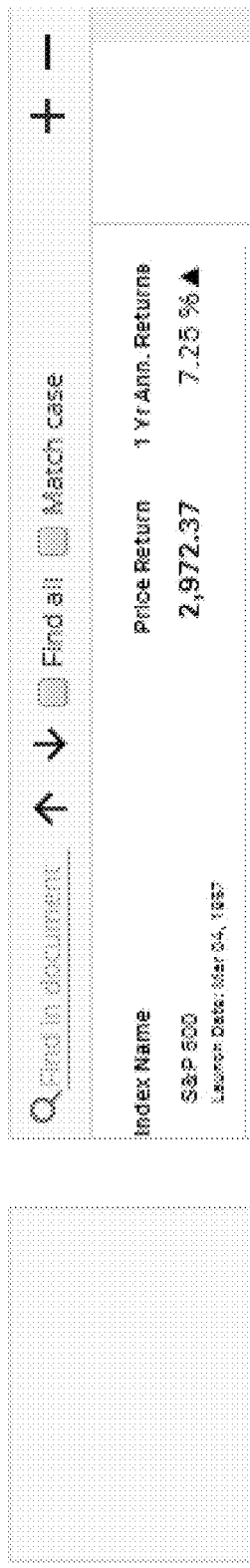

At step S414, the source evidence tagging module 302 receives a user input for selecting a document, and in response, the source evidence tagging module 302 displays a portion of the content from the selected document. Referring to FIG. 5C, a third screenshot 530 of the GUI according to an exemplary embodiment illustrates a portion of a user-selected document, together with a mechanism for enabling the user to find a specific alphanumeric text string and an instruction to assist the user with creating a screenshot of a selected section within the displayed content.

Figure 5D:
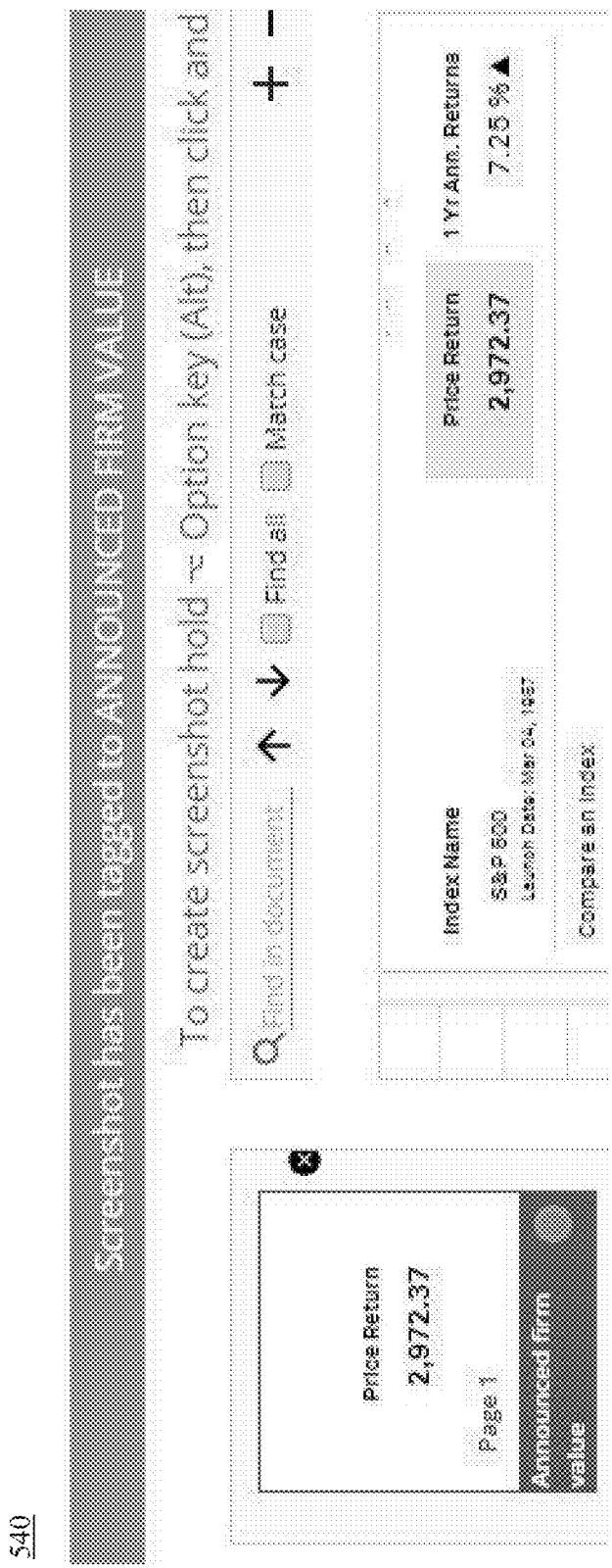

At step S416, the source evidence tagging module 302 receives a user input that corresponds to the creation of a screenshot of a selected section of the displayed content. The user-created screenshot serves as the source evidence for the particular value that had previously been entered into the field. Referring to FIG. 5D, a fourth screenshot 540 of the GUI according to an exemplary embodiment illustrates the content that has been selected by the user as the source evidence for a particular value, i.e., "Price Return 2,972.37".

Then, at step S418, the source evidence tagging module 302 automatically links the user-created screenshot to the "ANNOUNCED FIRM VALUE" field.

Figure 5E:
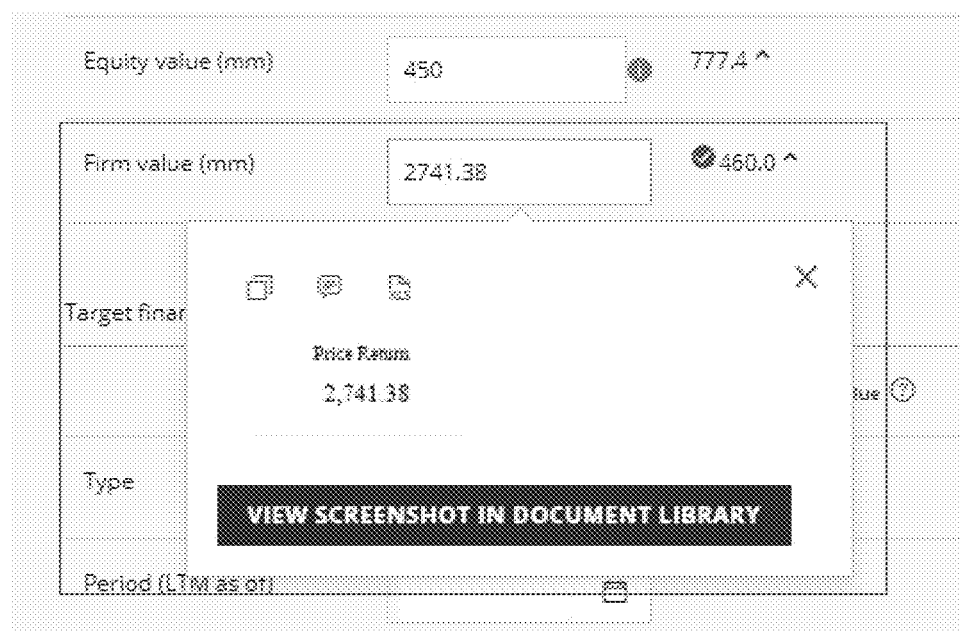

At step S420, the source evidence tagging module 302 detects that presence of a cursor that is hovering over a particular field, and in response, displays the source evidence that corresponds to that field, together with a button that enables a user to access the source document from the document library database 206(2). Referring to FIG. 5E, a fifth screenshot 550 of the GUI according to an exemplary embodiment illustrates the displaying of the corresponding source evidence as a result of the cursor hovering over the value entered into the "Firm value" field.

At step S422, the source evidence tagging module 302 determines whether there are any fields for which values have been inputted but no source evidence has been provided. If a determination is made that source evidence has been linked to every populated field, then the source evidence tagging module 302 validates the information and then uses the validated information to generate a fairness opinion at step S424. Conversely, if a determinations made that there is at least one populated field for which no source evidence has been provided, the source evidence tagging module 302 displays a warning icon or warning message in order to prompt the user to provide source evidence for the corresponding field.

In an exemplary embodiment, the source evidence tagging module 302 provides several additional options for user inputs that may be useful for generating a fairness opinion. For example, in some cases, a value that is entered by a user may be supportable by providing a formula and corresponding information that indicates how the formula is usable to determine the entered value. In these cases, the formula and the corresponding information act as source evidence for those fields.

In an exemplary embodiment, the source evidence tagging module 302 also provides a mechanism for enabling a user to upload a document that has not previously been stored in the document library database 206(2). For example, the source evidence tagging module 302 may display a clickable button via the GUI that prompts the user to identify a document to be uploaded, and when the user activates the button, the GUI may provide an area within which the user is able to input an Internet address, such as a Uniform Resource Locator (URL), from which the document is uploadable. The source evidence tagging module 302 may also provide a mechanism for enabling a user to input textual comments to be included in the fairness opinion.

Accordingly, with this technology, an optimized process for providing source evidence with respect to information that is usable for supporting values and valuations provided in connection with a fairness opinion generated in preparation for a mergers and acquisitions (M&A)-type transaction is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims. Further, although the invention has been described with respect to particular embodiments with respect to determining textual relevance and revenue relevance, various approaches to determining textual relevance and revenue relevance are contemplated, and as such, are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing source evidence in support of information to be used for conducting a transaction, the method being implemented by at least one processor, the method comprising:
   displaying, on a screen, a plurality of fields that relate to the transaction;
   receiving, from a user, a first user input that corresponds to a first field from among the plurality of fields;
   prompting the user to provide source evidence that relates to the received first user input;
   displaying, on the screen, a button that enables the user to access a document library database;
   receiving a second user input that activates the displayed button;
   displaying a list of documents included in the document library database;
   receiving a third user put that corresponds to a first document selected by the user;
   displaying a content of the first document;
   receiving a fourth user input that corresponds to a screenshot of a portion of the displayed content of the first document; and
   automatically linking the screenshot to the first field.

2. The method of claim 1, further comprising detecting that a cursor is hovering over the first field; and displaying the screenshot and a button that enables the user to access the first document in response to the detecting.

3. The method of claim 1; further comprising:
receiving, from the user, at least a first additional user input that corresponds to at least a second field from among the plurality of fields;
prompting the user to provide source evidence that relates to the received at least first one additional user input;
displaying, on the screen, the button that enables the user to access the document library database;
receiving at least a second additional user input that activates the displayed button;
displaying the list of documents included in the document library database;
receiving at least a third additional user input that corresponds to at least a second document selected by the user;
displaying a content of the at least second document;
receiving at least a fourth additional user input that corresponds to at least one additional screenshot of a portion of the displayed content of the at least second document; and
automatically linking the at least one additional screenshot to the at least second field.

4. The method of claim 3, wherein the transaction is a mergers and acquisitions transaction.

5. The method of claim 4, further comprising generating a fairness opinion report based on the received user inputs and the linked screenshots.

6. The method of claim 5, further comprising:
determining; prior to the generating of the fairness opinion report; whether there is at least one field for which no source evidence has been provided; and
when a determination is made that source evidence has been provided for all fields included in the plurality of fields, validating the information included in the received user inputs.

7. The method of claim 6; further comprising: when a determination is made that there is at least one field for which no source evidence is provided, displaying a warning icon that prompts the user to provide source evidence with respect to the at least one field prior to the generating of the fairness opinion report.

8. The method of claim 3, further comprising receiving, for a third field from among the plurality of fields and in response to the prompting, at least a sixth additional user input that includes a formula that corresponds to a value included in the third field.

9. The method of claim 1, further comprising:
displaying a button that enables the user to submit a request for uploading a user-identified document; and
in response to receiving the request, uploading the user-identified document and storing the user-identified document in the document library database.

10. The method of claim 1, further comprising displaying a comment field that enables the user to enter a textual comment.

11. A computing apparatus for facilitating a provision of source evidence in support of information to be used for conducting a transaction, the computing apparatus comprising:
a processor;
a memory;
a display screen; and
a communication interface coupled to each of the processor, the memory, and the display screen,
wherein the processor is configured to:
display, on the display a screen, a plurality of fields that relate to the transaction;
receive, from a user via the communication interface, a first user input that corresponds to a first field from among the plurality of fields;
prompt the user to provide source evidence that relates to the received first user input;
display, on the display screen, a button that enables the user to access a document library database;
receive a second user input that activates the displayed button;
display a list of documents included in the document library database;
receive a third user input that corresponds to a first document selected by the user;
display a content of the first document;
receive a fourth user input that corresponds to a screenshot of a portion of the displayed content of the first document; and
automatically link the screenshot to the first field.

12. The computing apparatus of claim 11, wherein the processor is further configured to detect that a cursor is hovering over the first field; and to display the screenshot and a button that enables the user to access the first document in response to the detection.

13. The computing apparatus of claim 11, wherein the processor is further configured to:
receive, from the user via the communication interface, at least a first additional user input that corresponds to at least a second field from among the plurality of fields;
prompt the user to provide source evidence that relates to the received at least first one additional user input;
display, on the display screen, the button that enables the user to access the document library database;
receive at least a second additional user input that activates the displayed button;
display the list of documents included in the document library database;
receive at least a third additional user input that corresponds to at least a second document selected by the user;
display a content of the at least second document;
receive at least a fourth additional user input that corresponds to at least one additional screenshot of a portion of the displayed content of the at least second document; and
automatically link the at least one additional screenshot to the at least second field.

14. The computing apparatus of claim 13, wherein the transaction is a mergers and acquisitions (M&A)-type transaction.

15. The computing apparatus of claim 14, wherein the processor is further configured to generate a fairness opinion report based on the received user inputs and the linked screenshots.

16. The computing apparatus of claim 15, wherein the processor is further configured to:
determine, prior to the generation of the fairness opinion report, whether there is at least one field for which no source evidence has been provided; and
when a determination is made that source evidence has been provided for all fields included in the plurality of fields, validate the information included in the received user inputs.

17. The computing apparatus of claim 16, wherein the processor is further configured to: when a determination is made that there is at least one field for which no source evidence is provided, display a warning icon that prompts the user to provide source evidence with respect to the at least one field prior to the generation of the fairness opinion report.

18. The computing apparatus of claim 11, wherein the processor is further configured to receive, for a third field from among the plurality of fields and in response to the prompting, at least a sixth additional user input that includes a formula that corresponds to a value included in the third field.

19. The computing apparatus of claim 11, wherein the processor is further configured to:
 display a button that enables the user to submit a request for uploading a user-identified document; and
 in response to receiving the request, upload the user-identified document and store the user-identified document in the document library database.

20. The computing apparatus of claim 11, wherein the processor is further configured to display a comment field that enables the user to enter a textual comment.

\* \* \* \* \*